United States Patent [19]

Voege

[11] Patent Number: 5,741,175
[45] Date of Patent: Apr. 21, 1998

[54] FLEXIBLE SHIELD FOR A TILE SAW

[76] Inventor: Richard E. Voege, 2560 Jacob St., Hayward, Calif. 94541

[21] Appl. No.: 753,535

[22] Filed: Nov. 26, 1996

Related U.S. Application Data

[63] Continuation-in-part of Ser. No. 543,384, Oct. 16, 1995, Pat. No. 5,577,955.

[51] Int. Cl.$^6$ .............................. B23Q 11/08; B23D 47/00
[52] U.S. Cl. ........................................ 451/455; 451/451
[58] Field of Search ................................ 451/451, 455, 451/454; 125/13.03, 11.22; 144/252 R

[56] References Cited

U.S. PATENT DOCUMENTS

| | | | |
|---|---|---|---|
| 2,491,957 | 12/1949 | Dilley | 160/351 |
| 2,714,926 | 8/1955 | Nichta | 160/191 |
| 2,766,561 | 10/1956 | Carlson . | |
| 2,867,064 | 1/1959 | Hermansson | 51/272 |
| 3,183,629 | 5/1965 | Ver Meulen | 451/455 |
| 3,824,890 | 7/1974 | Zettler et al. | 90/11 R |
| 4,077,161 | 3/1978 | Wyle et al. | 51/98 R |
| 4,423,568 | 1/1984 | Gould | 451/455 |
| 4,484,845 | 11/1984 | Pennella, Jr. et al. | 451/455 |
| 4,543,021 | 9/1985 | Adler | 451/455 |
| 4,578,907 | 4/1986 | Cayley et al. | 51/268 |
| 4,811,527 | 3/1989 | Ruopsa | 51/270 |
| 4,910,925 | 3/1990 | Longuet | 51/272 |

*Primary Examiner*—Eileen P. Morgan
*Attorney, Agent, or Firm*—Thomas M. Freiburger

[57] ABSTRACT

A plastic shield for a tile saw includes two vertical side panels, a back panel and a top panel, which in one embodiment are dismantlable separate panels. The components are quickly assembled together via slotted edges or connecting extrusions and when dismantled stack flatly within the water tray which is included as part of the tile saw apparatus. The tile saw shield is configured to allow normal use of the tile saw, without encumbering the user. It contains water from spraying out of the tray, to the extent that the tile saw can be used in an interior setting. In a second embodiment the shield is made of a flexible canopy with three sides and a top, supported by a bent rod frame which itself is secured in releasable fashion to fixed structure of the tile saw apparatus.

9 Claims, 6 Drawing Sheets

FLEXIBLE SHIELD FOR A TILE SAW

BACKGROUND OF THE INVENTION

This is a continuation-in-part of application Ser. No. 543,384, filed Oct. 16, 1995, to issue as U. S. Pat. No. 5,577,955.

The invention relates to tile saws, and more specifically the invention is concerned with a containment device for the spray of water from a tile saw, which normally prevents the saw equipment from being used in the interior of an interior setting.

Shields of various types have been well known, for a number of items of power equipment. For example, see U.S. Pat. Nos. 4,910,925, 4,811,527, 4,578,907, 4,077,161, 3,824,890, 3,183,629, 2,867,064, 2,766,561, 2,714,926 and 2,491,957.

Of the above patents, Ver Meullen U.S. Pat. No. 3,183,629 discloses a shield structure comprised of wall panels which are removable, the shield being applied to a belt grinder. Hermansson U.S. Pat. No. 2,867,064 discloses a splash guard involving a movable transparent panel. The splash guard is designed for machine tools and does not encompass the features and advantages of the present invention.

None of the above referenced patents shows a collapsible transparent tile saw shield having the features of the present invention described below. Moreover, nothing in the prior art shows a splash guard or shield for a tile saw, enabling the tile saw to be used indoors without damage to surrounding furniture, floors, etc.

SUMMARY OF THE INVENTION

In accordance with the present invention, a shield for a tile saw includes a plurality of panels, preferably transparent, which are assembled to rest within the tray of the tile saw. Typically a tile saw includes a water-containment tray with a shallow peripheral rim or wall. Left side, right side and back panels of the tile saw shield rest in the tray, just inside the peripheral lip, and are retained together by suitable edge securement means. A top panel completes the assembly, again being connected to the other three panels by an appropriate edge attachment. Thus, the four panels of the tile saw shield are easily erected and quickly dismantable. When dismantled, the panels stack flatly and compactly within the water tray of the tile saw apparatus, from which the motor/saw blade assembly is typically removed for transport. Thus, the panels are contained in a component which would otherwise be empty.

The erected shield of the invention effectively contains water from spraying out of the tray during use, to the extent that the tile saw apparatus can be used in an interior setting. Thus, an operator, when on a job such as an apartment above the ground floor, is not required to travel back and forth to an outdoor location of the tile saw, as is often required in conventional practice. The invention also allows work to continue in bad weather.

The tile saw shield is configured to allow normal use of the tile saw, without encumbering the user or the range of motion of the tile saw's tile cutting platform. The only exception is that the shield does not allow 12 inch tile to be cut because it prevents tile from hanging out over the tray's side edges. However, 12 inch tile will drip water on the floor and should be cut outdoors in any event, so that no real limitation is imposed.

Accordingly, in one embodiment the present invention comprises a shield apparatus for a tile saw which has a tray carrying a liquid bath and having a motor driven cutting blade over which the liquid passes, the shield being positioned to substantially prevent liquid from spraying or splashing out from the tile saw and beyond the tray. The shield includes a plurality of portable panels, with a back panel, left and right side panels and a top panel. These panels include connection means for retaining adjacent edges of the panels together in a generally rectangular arrangement of the panels, cooperating with the location of the panels just inside the lip or peripheral wall of the tray to retain the shield in place in the tray. The panel connection means include means for quickly erecting and quickly disconnecting the panels from each other. Further, each panel is of a size and shape such as to readily stack and fit flatly in the tray when disconnected from the other panels, for compact storage and transport.

In a preferred embodiment, all of the panels are of substantially transparent plastic material. They may be of acrylic material, such as the acrylics sold under the trademarks Lucite and Plexiglas. They may also be of polycarbonate material (as sold under the trademark Lexan, or any other transparent material having similar properties, preferably with some scratch resistance.

In one specific embodiment of the invention, the panel connection means comprises grooves formed adjacent to the edges of some of the panels, for receiving the edge of an adjacent panel in generally rectangular orthogonal relationship. Another preferred panel connection means is the use of extruded strips having two channels at right angles, for receiving edges of the panels. Preferably the side and top panels are of sizes to extend not to the front of the tray, but leaving space for an operator to conveniently operate the tile saw. For some configurations of tile saw, at least one of the side panels may be required to include a cut out area to accommodate support structure or other tile saw structure.

Hinging could alternatively be used for some of the connections (three maximum), with appropriate edge connection used for the remaining edge connections. The hinges (not shown) must be positioned and configured so as to allow the panels, when broken apart, to stack relatively flatly.

In a further embodiment, a shield is provided for a tile saw having motor, support structure and other elements which are not readily adaptable to the tile saw shield described above, formed of connected rigid panels. The saw shield of this embodiment utilizes a bracket which may be connected to the motor or other structure, the bracket supporting a rigid rod member bent and formed to provide a preferably horizontal support frame over the motor and partially over the blade. A flexible canopy forms the shield itself, slipped down over the support frame and extending over the edges of the saw's tray, so that water spraying against any of the three sides or the top of the shield canopy is directed down into the water tray of the apparatus.

It is therefore among the objects of the invention to provide a conveniently usable, quickly erectable, dismantable and storable shield apparatus for use with a tile saw. These and other objects, advantages and features of the invention will be apparent from the following description of a preferred embodiment, considered along with the accompanying drawings.

DESCRIPTION OF THE DRAWINGS

FIG. 11 is a perspective view similar to FIG. 10 showing the frame without the canopy shield.

FIG. 12 is a fragmentary detail view showing a base part of the bent rod frame and its manner of insertion and support in a bracket attached to fixed structure.

DESCRIPTION OF PREFERRED EMBODIMENTS

Figure 1:
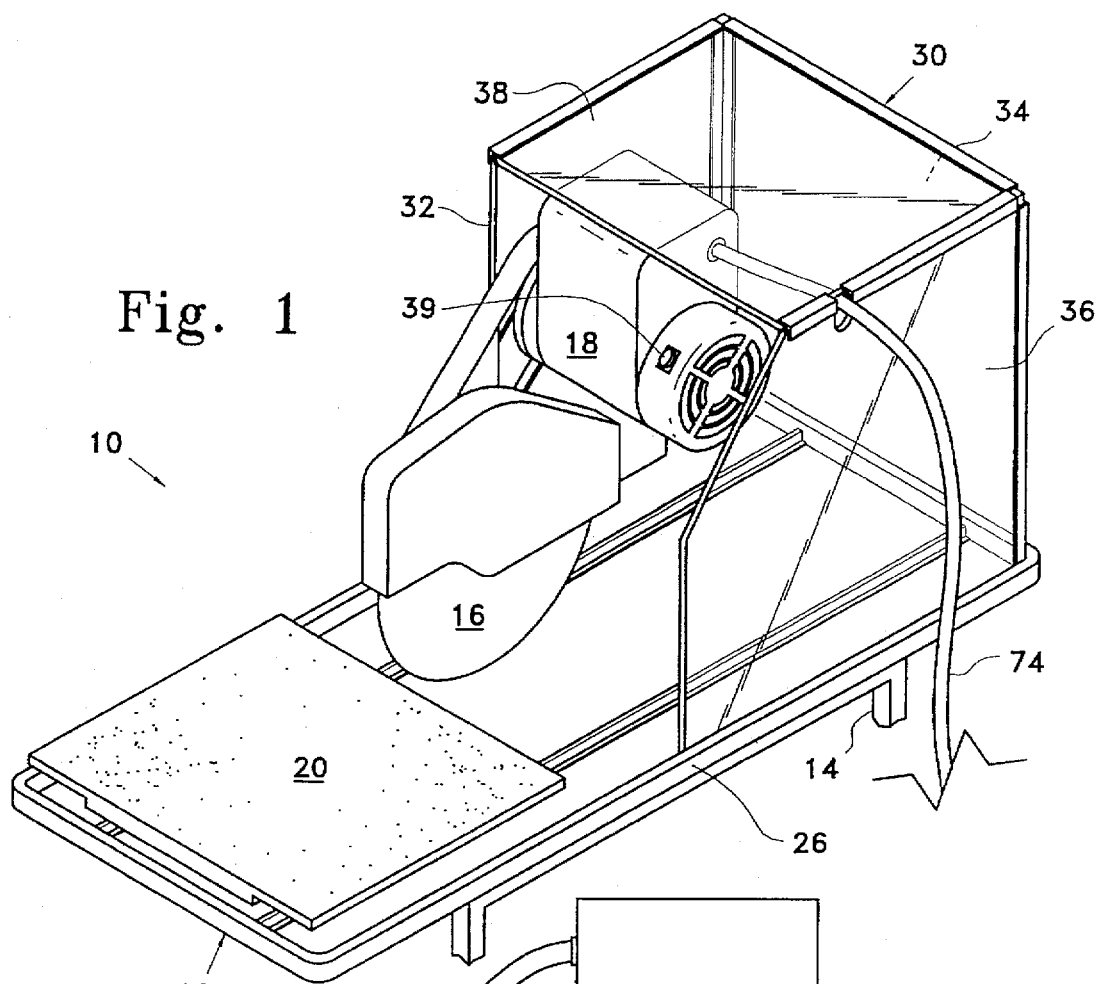
FIG. 1 is a perspective view showing a tile saw apparatus fitted with a tile saw shield according to the invention.
Figure 2:
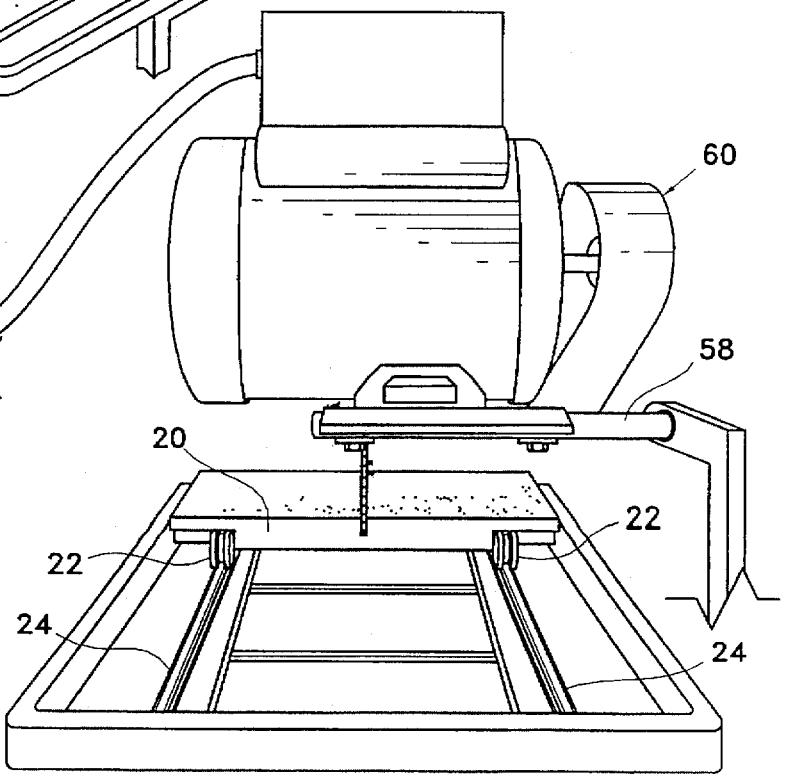
FIG. 2 is a rear elevation view of a tile saw apparatus, without the shield.

FIG. 1 shows a conventional tile saw apparatus generally identified as 10, with a liquid bath tray 12, a support stand or frame 14, a bearing-mounted tile saw blade 16, driven by a motor 18, and a movable carriage or stage 20 which is slidable forward and back under the blade 16 to cut tiles. As shown in FIG. 2, the movable stage 20 has rollers 22 which ride on tracks or rails 24, one on each side of the tray 12. The tracks 24 form an integral or permanently fixed part of the tray 12 in a conventional tile saw.

To use the tile saw apparatus 10, the operator places a tile, such as a ceramic tile, on the slidable stage 20, with the stage in a forward position relative to the saw blade 16, i.e. a position nearer the operator. With the saw blade rotating, the stage is pushed toward the back of the apparatus so that the tile is cut by the diamond-tipped saw blade, in a line parallel to the carriage tracks 24. The purpose of the tray 12, which has a lip or wall 26 around its perimeter, is to carry a bath of liquid (preferably water) which is constantly fed against the blade for cooling and lubrication as the cutting progresses. The feeding of the water to the blade is accomplished by a small electric pump (not shown) which draws water from the bath and delivers it via a tube (not shown) against the blade so that the cutting edge of the blade is always wet during the cutting operation.

FIG. 1 also shows a tile saw shield of the invention, generally identified as 30, secured in place on the tile saw apparatus 10. The illustrated tile saw 10 is of one specific type in common use, i.e. a Tile Master Model TM-1 tile saw manufactured by Felker Operations division of Federal-Mogul Corporation. U.S. Pat. No. 3,635,206 describes the slidable water tray of such a tile saw. However, the principles of the invention apply to tile saws in several different typical configurations.

As illustrated, the tile saw shield includes a left side panel 32, a back panel 34, a right side panel 36 and a top panel 38. The top panel 38 is shorter in length or depth than the side panels, extending approximately to the front of the motor 18, to allow easy access to a power switch 39 typically mounted at the front of the motor. These panels rest in the tray 12, just inside the lip or wall 26 of the tray as shown in FIG. 1. The four panels 32-38 preferably are of transparent plastic material which may be acrylic sheet material, polycarbonate or other material as noted above, and are secured together by their edges.

Figure 7:
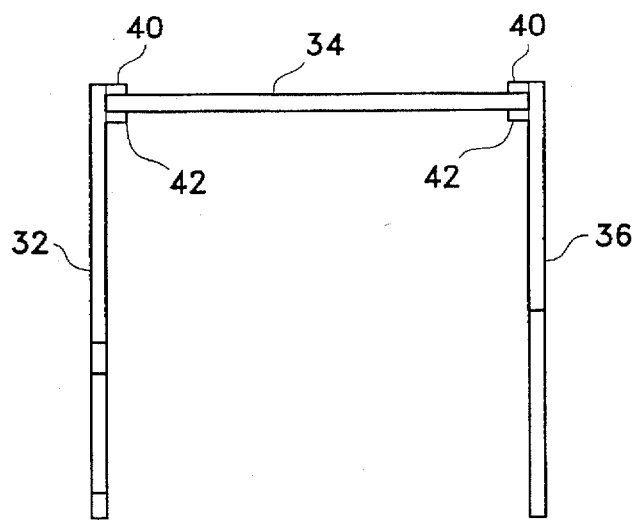
FIG. 7 is a top plan view schematically showing one form of edge assembly which may be used to retain the panels together.

Any suitable means of quick, efficient securement may be employed, one connection system being indicated in FIG. 7. As shown in FIG. 7, some of the panels may have a slotted arrangement at their edges, to receive an adjacent panel. Thus, the left side panel 32 may include at its back edge a pair of adjacent but spaced apart flanges 40 and 42, forming a vertical channel or slot into which the left edge of the back panel 42 is inserted and fairly closely fitted. Similarly, the back edge of the right panel 36 may include a pair of channel-forming flanges 40 and 42, forming a vertical channel or slot which faces to the left for receiving the right edge of the back panel 34 as illustrated. Alternatively, the back panel 34 could simply have forwardly-facing flanges 40 and 42 at each side, both facing forward, for receiving non-flanged edges of both the left and right side panels 32 and 36, but the FIG. 7 arrangement is preferred to restrain the side panels from pulling forward.

In FIG. 7 the top panel 38 is not shown. That panel may include similar flanges as in FIG. 7 to form channels for engaging over the top edges of the left, rear and right panels 32, 34 and 36 when placed thereon. These flanges may terminate short of the back left and right corners, so that they do not interfere with the vertically oriented flanges 40 and 42 on the rear panel 34 and/or the side panel 32 or 36. Alternatively, the flanges 40 and 42 of the rear or side panels could be truncated to less than full height to avoid flange to flange interference.

The channels formed by these flanges provide for quick erection and dismantling of the tile saw shield.

The channel-forming flanges 40 and 42 can simply comprise linear acrylic moldings secured to the surfaces of the flat panels, as by solvent bonding.

Figure 9:
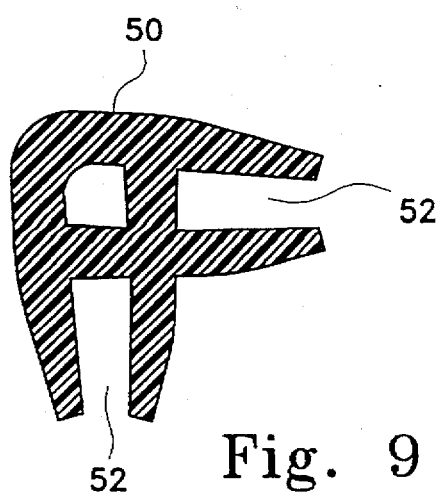
FIG. 9 is a sectional view showing an extrusion which may be used to secure the shield panels edge-to-edge, as an alternative to the configuration shown in FIG. 7.

As another preferred form of panel connection, an extrusion such as shown in FIG. 9 can be used for holding the panels together at their edges. Such an extrusion 50, formed of relatively hard plastic or of a rubbery plastic material and having channels 52 at right angles, is engaged onto the edges of certain panels, such as the top panel and the back edges of the left and right side panels, preferably permanently as by solvent bonding. The extrusions are then engaged over the adjacent panel edge as the tile saw shield is assembled. Five lengths or strips of the extrusion are used for the assembly shown. The extrusion 50 allows quick dismantling of the tile saw shield assembly, with each strip preferably remaining on one or the other of the adjacent panel edges.

In another embodiment of edge connection (not shown), some of the panels may simply have a right angle bend at an edge for engagement over an adjacent panel edge. Three edges of the top panel can be angled. The resulting assembly, however, tends to be less stable than the assemblies described above.

As noted above, some of the panels could alternately be hinged together at edges (not shown). The hinges can simply be bendable plastic hinges, continuous through the length of an edge. They can be applied, for example, at side to back panel connections. The top panel could also be hinged from one of the other panels. Hinging is limited by the ability to insert panels around saw structure, and may be more appropriate for saws other than the type illustrated.

Figure 6:
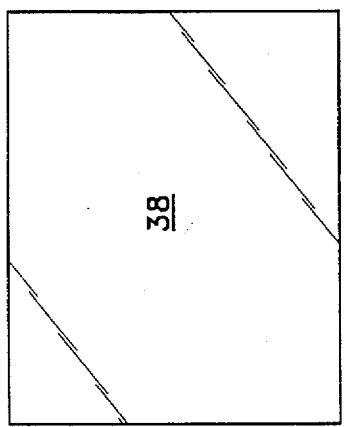
Figure 8:
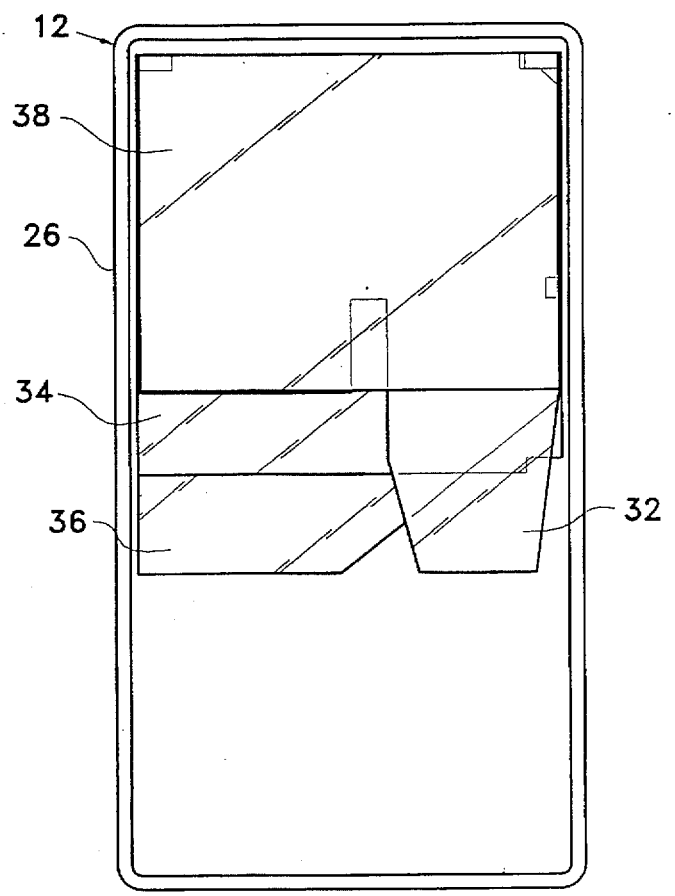
FIG. 8 is a top plan view showing a tray of the tile saw apparatus, with the disassembled shield panels stacked in the tray.

FIG. 8 illustrates, somewhat schematically, an important feature of the invention. All of the four shield panels 32-36 are dimensioned so as to fit within the confines of the perimeter lip or wall 26 of the liquid containing tray 12. The panels are shown stacked in the tray in FIG. 8, with the motor/blade assembly removed (this and other types of tile saw provide for lifting the tray off the frame, and separation of the motor/blade assembly from the frame). The height of the tile saw shield, i.e. the side and back panels, is such that all three of these panels fit between the lips 26 at left and right of the liquid tray. The top panel 38 may have a width sufficiently narrow to fit within the tray, depending on the type of edge securement used, but in any event its length is preferably less than its width, as shown in FIG. 6, so that it can easily be turned at right angles to its erected position for stacking in the tray. With the four panels stacked in the tray, the shield is easily and compactly stored and transported along with the saw apparatus, requiring no additional bulk and little additional weight.

Figure 5:
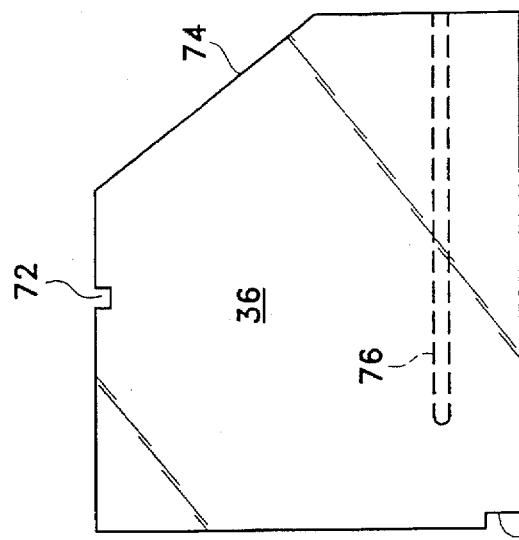
FIG. 3, 4, 5 and 6 are plan views showing unassembled left, rear, right and top panels in accordance with one embodiment of the tile saw shield, for a specific type of tile saw, all panels being viewed at their inside surfaces.
Figure 4:
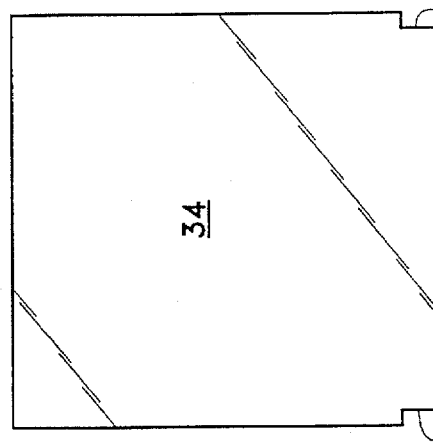
Figure 3:
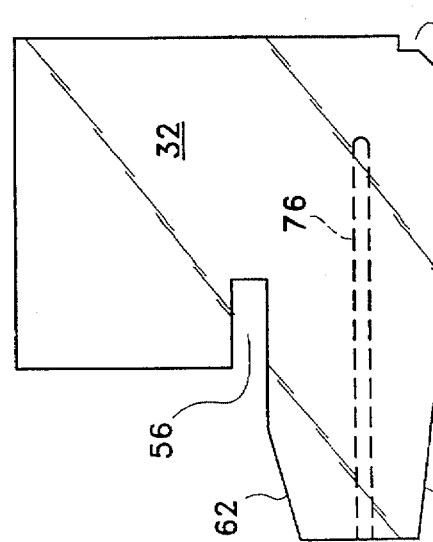

As indicated in FIG. 3, 4 and 5, the side and back panels may be somewhat irregular in shape, to accommodate various features of the liquid bath tray or of other structural features of the tile saw. For example, the left side panel 32 (its inside surface is shown in FIG. 3) may include a slot 56 for accommodating a structural support bar 58 which supports the motor and blade assembly 60, as seen in FIG. 2. Also, edges at 62 and 64 may be slightly angled, to allow this panel to be inserted under the support bar 58, which requires an initial tilt to permit the insertion. Also, FIGS. 3–5 show rear corner cut outs 66, 68 and 70 at the bottom corners of the side and back panels. These are to accommodate the shape of the liquid bath tray 12, which, as shown in FIG. 8, typically has a radius at each corner. The notch 66 is shown as including an angled cut for ease of assembly of the shield into the tray. Further, a notch 72 may need to be provided at the top edge of one of the panels, such as the right side panel 36 shown in FIG. 5, to accommodate an electrical cord 74 (FIG. 1) extending from the motor. All interior corners of notches and cutouts preferably have a small radius. The right panel 36 is shown with an angled edge 74, simply because it extends farther to the bottom than at the top panel. This and other edges could be curved rather than straight. FIGS. 3 and 5 also show in dashed lines an optional elongated slot-shaped cutout 76 in both side panels, which may be provided to accommodate wider tiles than the spacing between the two side panels. The dashed lines indicate this as an optional feature.

In some models of tile saws the liquid tray (e.g. shown at 12 in FIGS. 1 and 2) has a different configuration at the inside edge leading to the bottom, and in some models the motor and other elements and structure over the tray are not adaptable to a rigid-panel tile saw shield as described above with panels sitting within the tray edges. FIGS. 10 through 13 show an embodiment of a tile saw shield according to the invention, for tile saws of configurations which will not readily accept the panels as shown and described above. Such tile saws include MK Diamond Models 660 and 101 tile saws which have structure which would obstruct these solid panels as described above.

Figure 10:
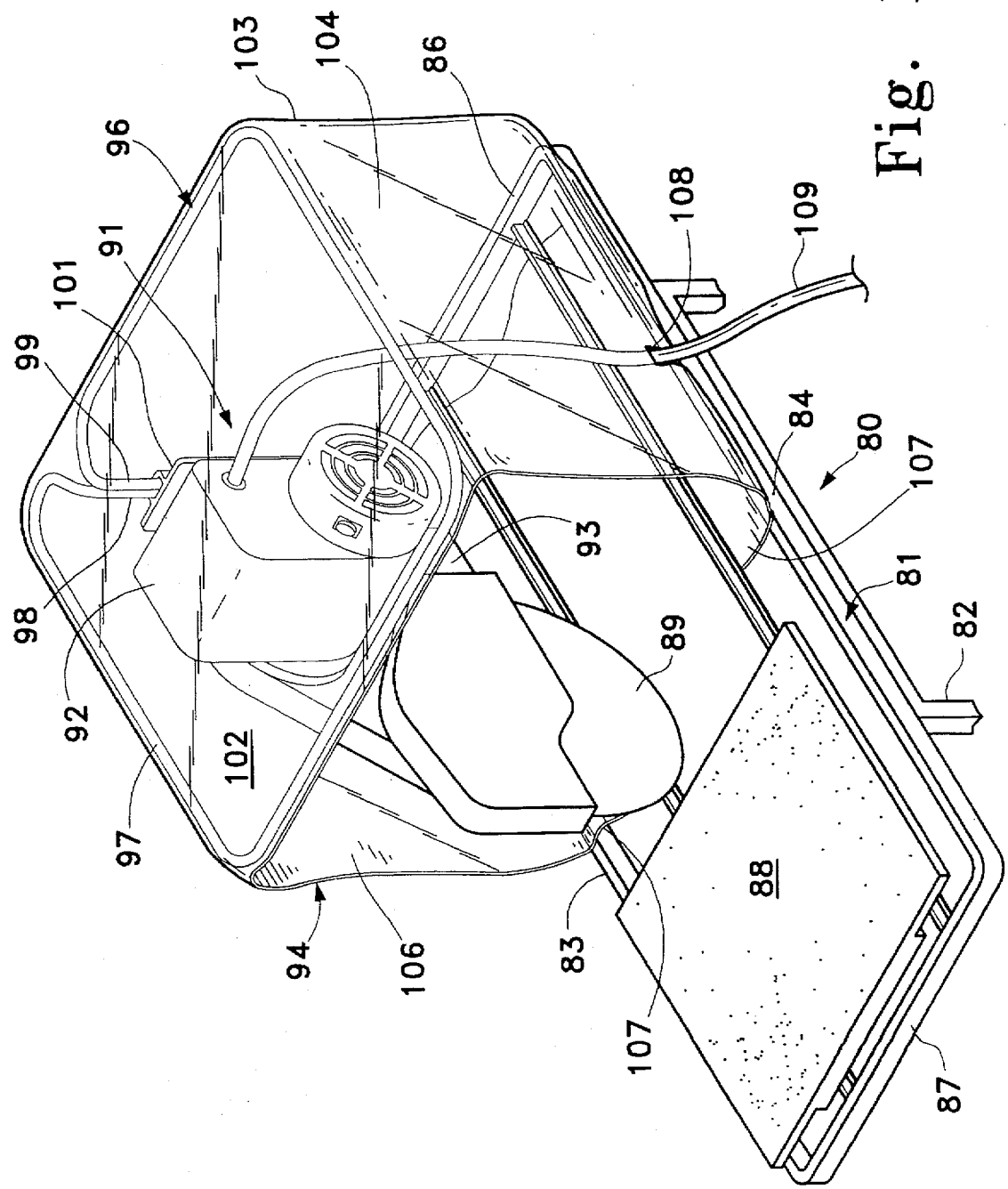
FIG. 10 is a perspective view showing another embodiment of the invention, in which a bent rod frame supports a flexible canopy as a shield, for certain models of the tile saws.

FIG. 10 shows a tile saw 80 which has a water tray resting on a base frame 82. The water tray has left and right sides or edges 83 and 84, a back side or edge 86 and a front side 87. The usual slidable stage 88 is movable back and forth relative to the tray and to a cutting blade 89 driven by a motor 91 having a motor housing 92. The motor 91, comprising fixed structure of the tile saw apparatus, is supported by additional fixed structure including a motor mounting frame, a portion 93 of which is visible in FIG. 10. The motor mounting frame 93, and/or other fixed structure of the tile saw apparatus 80 illustrated in FIG. 10, prevent the use of the relatively rigid panels described above and shown in FIGS. 1–9 of the drawings.

In this embodiment a flexible canopy 94 of sheet material which may be translucent or transparent is draped over a frame 96 formed of a rod or heavy wire, bent into a supporting configuration. As indicated in FIGS. 10 and 11, one preferred configuration is a generally rectangular top portion 97 in generally a horizontal plane, bent so as to have its two ends 98 and 99 extending generally vertically, into a frame support bracket 101. The top portion should have at least two sides and a back. The frame support bracket 101, fixedly secured to the motor housing 92 or other fixed structure of the tile saw apparatus 80, slidingly receives the ends 98 and 99 of the rod or wire frame, in a manner so as to allow quick and easy release. At the same time, the rod ends 98 and 99 are closely received in the bracket and stably and reliably hold the frame 96 in reliably hold the frame 96 in position.

As seen in FIG. 10, the flexible canopy 94 has a top 102, a rear or back panel 103, a right side panel 104 and a left side panel 106. The canopy is formed to fit relatively closely over the rectangular top portion of the frame 96, and to drape downwardly and generally vertically, at positions which are preferably outside the outer edges of the tray 81, or at least as far out as those outer edges. At the same time, these sides and back 104,106 and 103 have bottom ends or skirts 107 of sufficient length to be tucked back into the water tray 81. As shown in FIG. 10, the lower portions of these skirts or ends 107 are simply folded or curved inwardly, so that they lie inside the tray to return all water which will splash or be thrown outwardly from the tile cutting operation.

As also shown in FIG. 10, the flexible canopy 94 preferably has an opening 108 for a power cord 109 leading to the motor. At the opposite side of the tile saw apparatus the motor support structure 93 and associated structure not specifically shown in the drawings is in a position to block the return of the canopy end or skirt in that region. Some tile saws include relatively complex frame hardware which would interfere with the use of a solid saw shield as described earlier and which also interferes with the tucking of the skirt or lower edge of the flexible canopy into the tray. For this purpose, the canopy includes one or more slits or cut-outs to accommodate such obstructions. If these cut-outs or slits are appropriately formed little or no water will escape the canopy and the tray.

Figure 13:
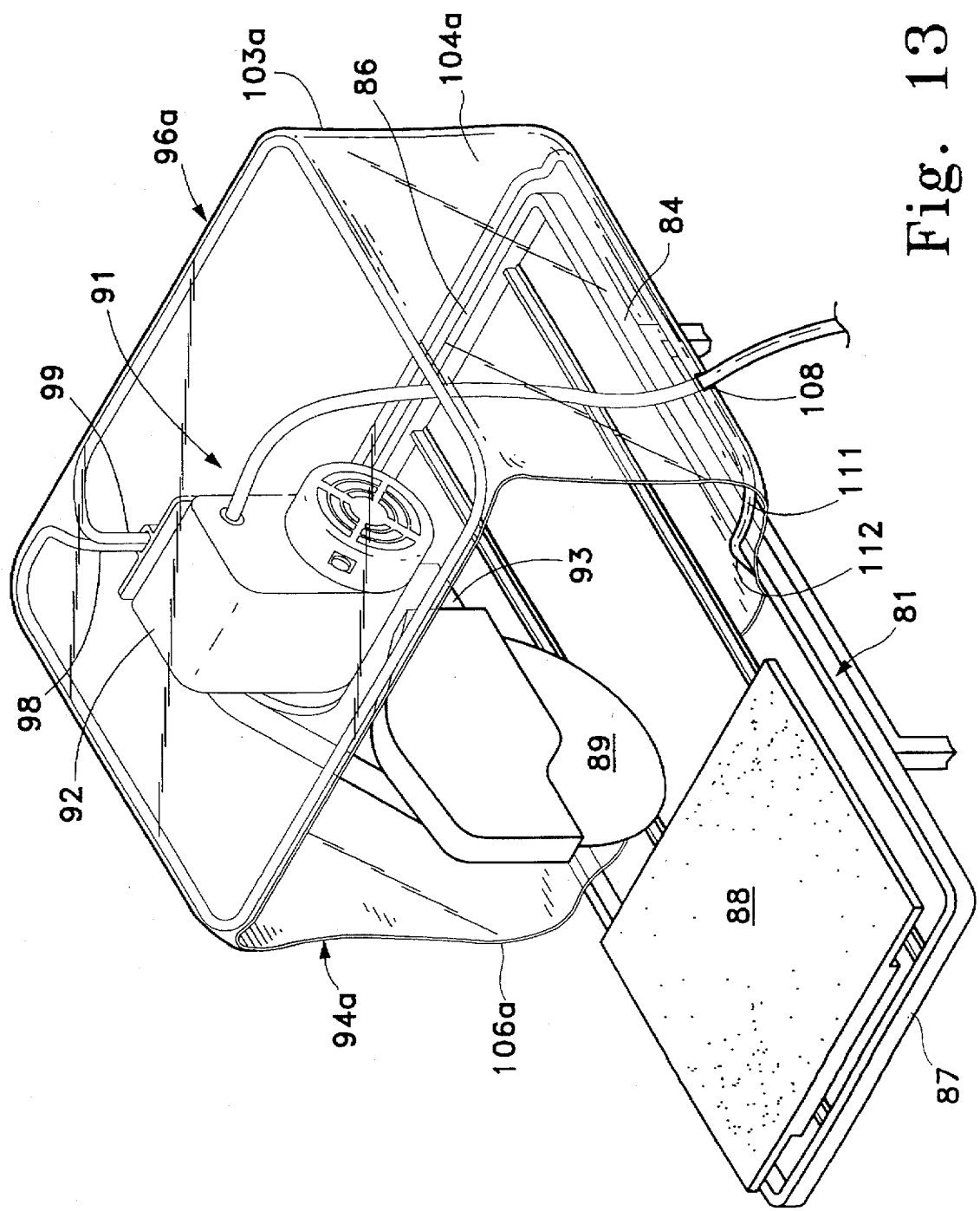
FIG. 13 is another perspective view similar to FIG. 10 but showing a variation.
Figure 13:
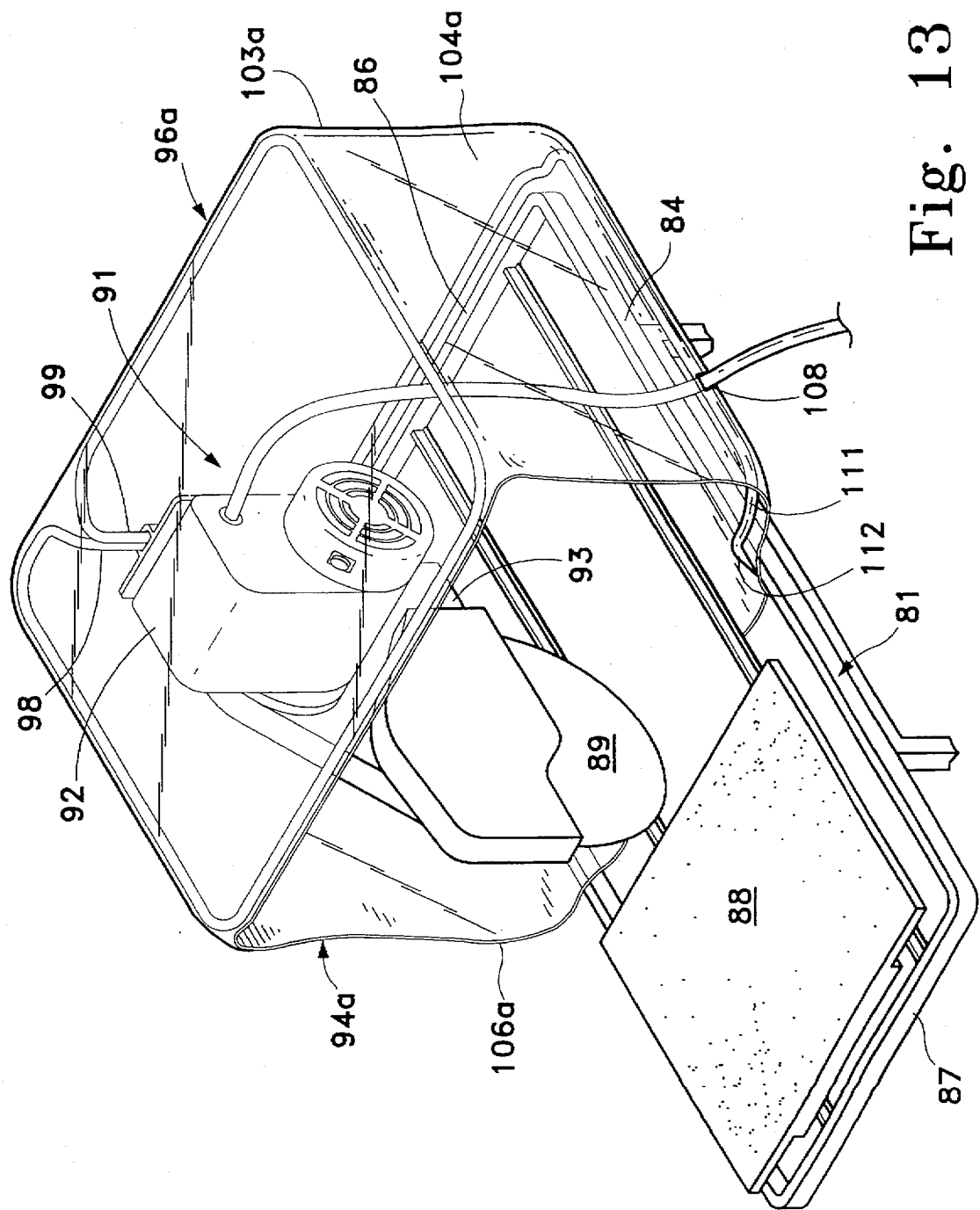

It is therefore seen that the tile saw shield of FIG. 10, comprising the removable frame 96 and flexible canopy 94, preferably extend out beyond the edges of the water tray 81 and provide for cutting of relatively wide and long tiles without interference. However, for larger tiles the embodiment of FIG. 13 can be employed. In this variation, the canopy support frame 96a is made wider and can also be made deeper (extending farther back), so as to support a larger flexible canopy 94a as shown. FIG. 13 illustrates that at least the sidewall 104a extends laterally beyond the tray to a greater extent than what is shown in FIG. 10. Although both lest and right sides can be widened, optionally only the right side or panel 104a can extend farther, to provide for wider tiles; additional rearward extention of the rear panel 103a is also an option for situations where needed. It is generally sufficient, for larger tiles, that only the right side and rear panels 104a and 103a be extended out a significant distance from the side 84 and back 86 of the water tray. For this embodiment of the invention, a lower wire frame 111 may be provided, extending at least along the right side and back interior of the canopy 94a. As illustrated, this heavy wire frame 111 may have a front end 112 terminating in a downward turn for gripping along the side of the water tray; a similar second end may be formed at the back left of the apparatus, not visible in FIG. 13. The lower wire frame 11 maintains the shape of the lower portion or skirt of the involved sides of the flexible canopy, particularly the right side 104a and the rear side 103a as shown.

The flexible tile saw shields illustrated in FIGS. 10–13 and described above will retain substantially all water from being sprayed or splashed out of the tile saw apparatus, such as when working in indoor locations, while still allowing for unrestricted cuts in tiles at least as large as thirteen inches by thirteen inches.

The above described preferred embodiments are intended to illustrate the principles of the invention, but not to limit its scope. Other embodiments and variations to these preferred embodiments will be apparent to those skilled in the art and may be made without departing from the spirit and scope of the invention as defined in the following claims.

I claim:

1. In combination with a tile saw having a tray with sides and a back and carrying a liquid bath and the tile saw having fixed structure including a motor driving a cutting blade over which the liquid passes and a movable stage on rollers facilitating movement of the stage by an operator toward and under the cutting blade to cut a tile carried on the stage, a tile saw shield positioned to substantially prevent liquid from spraying or splashing out from the tile saw and beyond the tray, comprising:

a support frame formed of at least one rod contoured into generally an upper plane above the motor and having at least left and right sides and a back side thus defining an open frame, and including means for securing the support frame on fixed structure of the tile saw and for quick removal of the frame from the fixed structure, and a canopy formed of flexible sheet material, the canopy having a top configured to fit generally on said upper plane of the support frame, and a back and two sides, the canopy having bottom edges extending down sufficiently to curve or fold back into the tray in a position such that liquid spraying or splashing out from the tile saw will drain down interior sides and back of the canopy and into the tray, and the canopy being of such size as to fit over the support and at least one side frame so as to drape downwardly with its back and at least one side extending out at least as far as the side and back edges of the tray, whereby relatively large tiles may be cut without interference from the tile saw shield.

2. The tile saw apparatus of claim 1, wherein the means for securing the frame to fixed structure of the tile saw comprises end portions of the frame being inserted into a frame receptacle bracket secured to said fixed structure, the frame receptacle bracket including means for closely and stably receiving the frame ends and for releasing the frame ends when they are pulled from the bracket.

3. The tile saw apparatus of claim 2, wherein the frame is formed of a single bent rod, formed generally into a rectangle forming the two sides and back and also forming a front portion and the rod having two ends comprising said frame ends.

4. The tile saw apparatus of claim 1, wherein the frame receptacle bracket is secured to a housing of the motor.

5. The tile saw apparatus of claim 1, wherein the canopy is formed of flexible, translucent sheet plastic material.

6. The tile saw apparatus of claim 1, wherein at least one side and the back of the canopy extend outwardly beyond the side and back of the tray, with ends of the side and back tucked into the tray over the side and back of the tray, and further including a wire frame formed of a singe piece of bent wire and having a back and side portions and being inserted into the canopy in such a way as to hold lower portions of said one side and back of the canopy in positions outward from the tray, whereby large tiles can be cut without obstruction by the canopy.

7. The tile saw apparatus of claim 6, wherein the canopy is large enough to allow cutting of 13" by 13" tiles.

8. The tile saw apparatus of claim 1, wherein the flexible sheet material of the canopy is translucent.

9. The tile saw apparatus of claim 1, wherein the sides and top of the canopy are of sizes to extend less than to the front of the tray, leaving space for an operator to conveniently operate the tile saw.

* * * * *